United States Patent [19]
Zeritis

[11] Patent Number: 5,560,756
[45] Date of Patent: Oct. 1, 1996

[54] CHIMNEY SMOKE SCRUBBER

[76] Inventor: Nikolaos Zeritis, 4061 39th Ave., Oakland, Calif. 94619

[21] Appl. No.: 514,752

[22] Filed: Aug. 14, 1995

Related U.S. Application Data

[63] Continuation-in-part of Ser. No. 391,784, Feb. 21, 1995, abandoned, and Ser. No. 134,636, Oct. 12, 1993, Pat. No. 5,395,408.

[51] Int. Cl.$^6$ ................................................. B01D 47/06
[52] U.S. Cl. .............................. 55/227; 55/240; 261/118; 261/126
[58] Field of Search ............................. 55/220, 227, 240, 55/257.5; 261/118, 126

[56] References Cited

U.S. PATENT DOCUMENTS

| | | | |
|---|---|---|---|
| 227,420 | 5/1880 | Dunn et al. ............................. | 261/126 |
| 639,497 | 12/1899 | Bangs et al. ............................ | 55/257.5 |
| 1,102,996 | 7/1914 | Bottenstein .......................... | 261/118 X |
| 1,639,179 | 8/1927 | Hamel .................................. | 55/220 X |
| 1,948,348 | 2/1934 | Gerhold ............................... | 55/220 X |
| 2,585,440 | 2/1952 | Collins ................................. | 55/227 X |
| 2,593,548 | 4/1952 | Edwards .............................. | 261/118 X |
| 2,937,013 | 5/1960 | Fisher ................................. | 55/257.5 X |
| 3,395,656 | 8/1968 | Ford et al. ............................ | 55/220 X |
| 3,546,851 | 12/1970 | Hardison et al. ................... | 55/257.5 X |
| 3,589,609 | 6/1971 | Wyant et al. ........................ | 55/227 X |
| 3,605,386 | 9/1971 | Erwin et al. ......................... | 55/227 X |
| 3,733,789 | 5/1973 | Rebours .............................. | 55/240 X |
| 3,767,177 | 10/1973 | Engalitcheff, Jr. et al. ........ | 261/118 X |
| 3,841,060 | 10/1974 | Hoad .................................... | 55/220 |
| 4,019,882 | 4/1977 | Herrera ................................ | 55/220 |
| 4,452,614 | 6/1984 | Kovac .................................. | 55/220 |

FOREIGN PATENT DOCUMENTS

| | | | |
|---|---|---|---|
| 2503280 | 7/1976 | Germany .............................. | 55/257.5 |
| 0224498 | 7/1985 | Germany .............................. | 55/220 |
| 0575293 | 4/1958 | Italy ..................................... | 55/240 |

*Primary Examiner*—Robert Spitzer
*Attorney, Agent, or Firm*—Harris Zimmerman

[57] ABSTRACT

A chimney smoke scrubber for use with stoves and fireplaces includes a chimney cap enclosure secured atop the chimney or flue pipe of the combustion unit. The combustion gases from the enclosure are deliver through a duct to a smoke scrubber assembly. The scrubber assembly includes a tank holding a charge of water, with flow space above the water surface for smoke to pass. A stack extends upwardly from the flow space of the tank to release the flue gas to atmosphere. The upper end of the stack includes outlet holes or a screen, and a stack cap having an interior deflector. A nozzle is disposed within the stack and directed to emit a controlled spray upwardly to impinge on the deflector cap. The spray and the deflected water form a curtain of water that cascades downwardly past the outlet holes or screen, so that the smoke and gases must pass through the water cascade as they are discharged. The smoke and flue gases are contacted by the water, cooling and cleaning them, extinguishing all cinders, and removing all fly ash. A submersible pump within the tank feeds water from the tank to the nozzle. A water input line extends into the tank, and is connected to a float valve which maintains a desired water level and flow space in the tank. The submersible pump is connected to electrical power through a switch disposed within the dwelling adjacent to the stove or fireplace that generates the smoke and flue gas.

10 Claims, 2 Drawing Sheets

CHIMNEY SMOKE SCRUBBER

REFERENCE TO RELATED APPLICATION

This application is a continuation-in-part of U.S. patent application Ser. No. 08/391,784, filed Feb. 21, 1995, now abandoned, and Ser. No. 08/134,636, filed Oct. 12, 1993, now U.S. Pat. No. 5,395,408, for which priority is claimed.

BACKGROUND OF THE INVENTION

In the past two decades there has been a renewed interest in non-petroleum fuels for heating, particularly for domestic use. Many individuals have installed high efficiency stoves that burn wood and wood byproduct fuels, or fireplace inserts for existing fireplaces that increase combustion efficiency, heat distribution, and safety. The use of wood and wood byproducts, which are renewable resources, is apparently a significant step away from reliance on petroleum, which is becoming depleted and will become more expensive. Moreover, wood fuels are produced primarily domestically, whereas oil and natural gas for heating are produced predominantly by offshore sources and are subject to the vagaries of foreign control.

Combustion of wood inherently produces more smoke, soot, and other byproducts that combustion of oil or natural gas. Thus an unfortunate side effect of increased use of wood for domestic heating is an increase in air pollution. In some communities where many individuals have adopted wood-fired heating systems, there is a noticeable degradation in air quality during the winter heating season. Indeed, some communities have had to limit wood-fired heating systems to meet minimum air quality standards set by state and federal regulations.

Another disadvantage of the use of wood-burning stoves and fireplaces is the release of sparks and cinders from the chimney. These hot particles are capable of starting roof fires, especially on wood shake roofs, and also setting fire to surrounding vegetation such as trees, dry grass, and the like. Most communities require spark arresters atop the chimney, but their effectiveness can be affected by high winds, low humidity, and the type of fuel being burned.

There are known in the prior art many forms of smoke scrubbers and stack gas scrubbers. One example is U.S. Pat. No. 5,395,408, issued Mar. 7, 1995 to the present inventor. These devices generally treat smoke and gas from a flue by washing the flue gases with water or an aqueous solution. The flue gases may be driven by blower through a tank containing the aqueous solution, so that the gas bubbling through the liquid is cooled, hot particles are extinguished, and particulates are picked up by the liquid. However, the blower itself can cause noise and vibration inside the dwelling, which may be objectionable to some persons.

SUMMARY OF THE PRESENT INVENTION

The present invention generally comprises a chimney smoke scrubber device adapted for domestic use. The chimney smoke scrubber is particularly adapted for use with wood-fired stoves, fireplaces, and the like, although other combustion devices utilizing other smoky fuels may also benefit from the invention.

The chimney smoke scrubber includes a chimney cap enclosure secured atop the chimney or flue pipe of a combustion unit. The smoke and combustion gases from the enclosure are deliver through a transfer duct to a smoke scrubber assembly. The scrubber assembly comprises a tank holding a charge of water or aqueous solution, with flow space above the water surface for smoke to pass. A stack extends upwardly from the flow space of the tank to release the smoke and flue gas to atmosphere. The upper end of the stack includes outlet holes or a screen, and a stack cap having an interior deflector. A nozzle is disposed within the stack and directed to emit a controlled spray upwardly to impinge on the deflector cap. The spray and the deflected water are arranged to cascade downwardly past the outlet holes or screen, so that the smoke and gases must pass through the water cascade as they are discharged. The smoke and flue gases are contacted by the water, cooling and cleaning them, extinguishing all cinders, and removing all fly ash.

A submersible pump within the tank pumps the water from the tank to the nozzle. A water input line extends into the tank, and is connected to a float valve or the like which maintains a desired water level in the tank. The tank is also served by a drain controlled by a manual valve. The submersible pump is connected to electrical power through a switch which is disposed within the dwelling adjacent to the stove or fireplace that generates the smoke and flue gas.

DESCRIPTION OF THE PREFERRED EMBODIMENT

Figure 1:
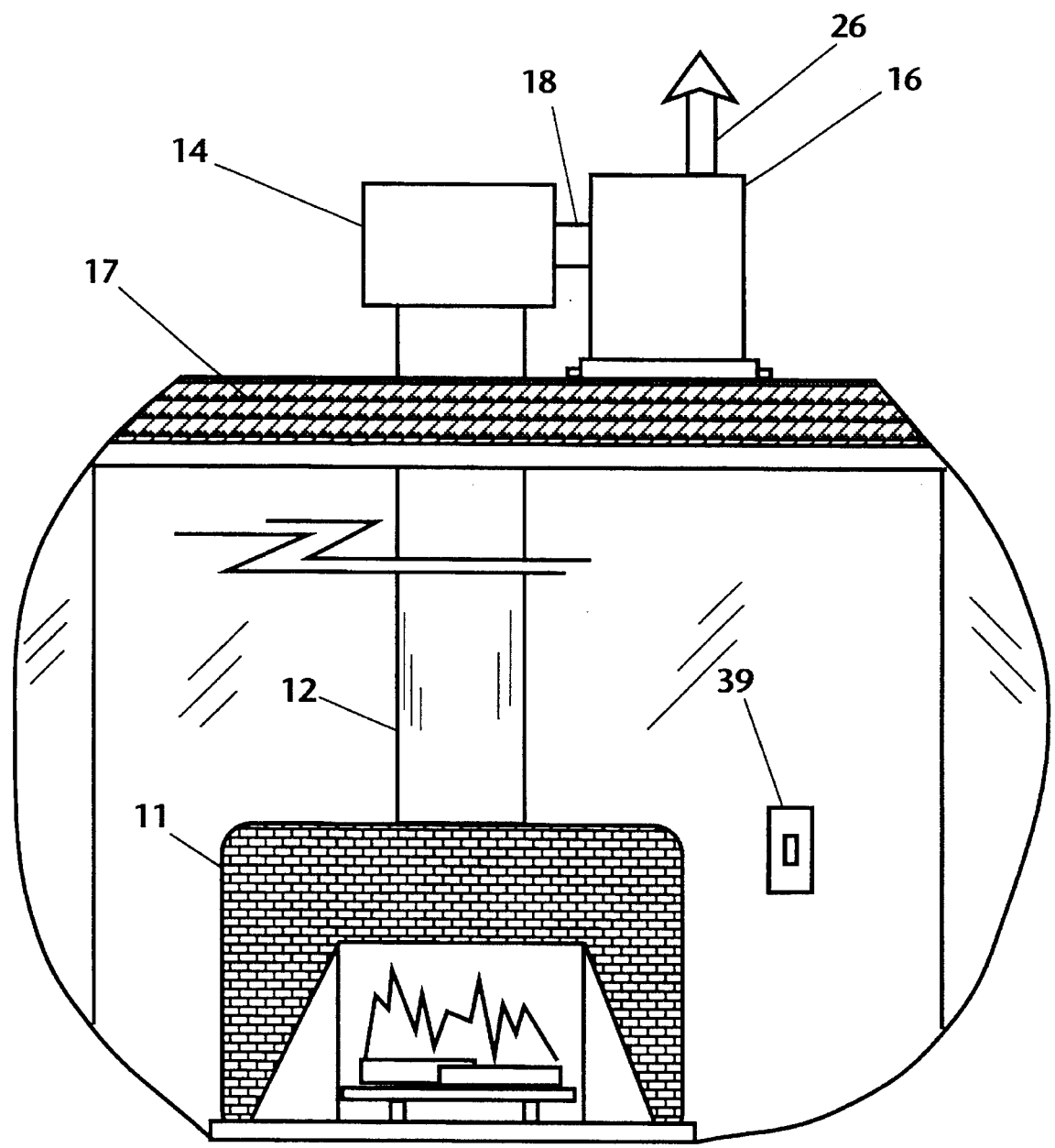
FIG. 1 is a plan elevation of the smoke scrubber of the invention mounted in a typical home installation.

The present invention generally comprises a chimney smoke scrubber device adapted for use with wood-fired stoves, fireplaces, and the like, although it may be used with other combustion devices utilizing other smoke-generating fuels. With regard to FIG. 1, a typical combustion device 11 such as a fireplace or stove is connected to a chimney or flue 12. The smoke scrubber includes a chimney cap enclosure 14 secured atop the chimney or flue pipe 12. The smoke scrubber further includes a scrubber assembly 16 mounted on the roof 17 adjacent to the chimney. A transfer duct 18 extends from the enclosure 14 to the assembly 16 to convey all smoke and flue gas into the assembly 16.

Figure 2:
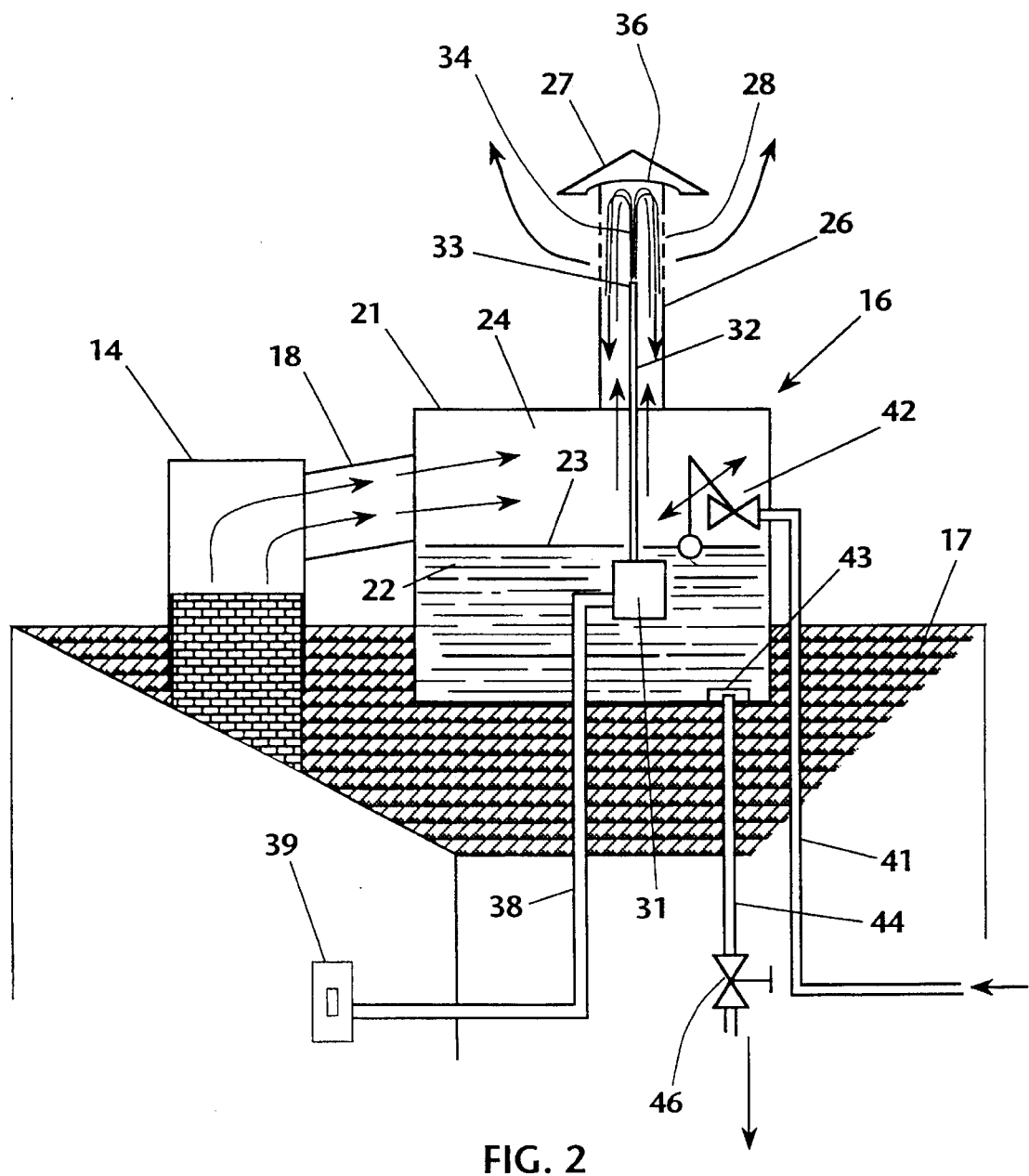
FIG. 2 is a schematic representation of the scrubber chamber and stack portions of the invention.

With regard to FIG. 2, the scrubber assembly 16 comprises a closed tank 21 that contains a charge 22 of water filled to a predetermined level 23. Above the water level 23 there is defined a flow space 24 through which smoke and flue gases may pass. A stack 26 extends upwardly from the tank 21, and is connected to the flow space 24. Thus the flue gases and combustion products from the chimney are directed by the enclosure 14 and duct 18 into the tank 21, from which they are discharged to the atmosphere through the stack 26. The stack includes a plurality of openings or a screen portion 28 adjacent to the upper end thereof to permit egress of the smoke and gases. In addition, a cap 27 is secured to the upper end of the stack.

Disposed within the tank 21 and immersed in the water 22 is a submersible pump 31 adapted to take in water from the tank and pump the water through an outlet pipe 32 that extends upwardly into the stack 26. At the upper end of the pipe 32, a nozzle or jet 323 emits a fountain-like spray 34. The spray 34 is directed upwardly toward a deflector 36 secured to the inner end of the stack cap 27. The spray 34 interacts with the deflector 36 to form an annular curtain of water that cascades downwardly past the openings or screen portion 28 through which the smoke and flue gases must pass. As a result, the smoke and flue gases are intimately contacted by the water, cooling and cleaning them, extinguishing all cinders and embers, and removing all fly ash. The discharge from the stack 26 thus is substantially scrubbed, so that the discharged gases are significantly cleaner than comparable untreated chimney discharges.

The submersible pump 31 is connected through cable 38 to a switch 39 disposed within the dwelling adjacent to the stove or fireplace 11. The tank 21 is supplied with water through a pipe 41 connected to a pressurized water line. The pipe 41 is connected within the tank to a float valve 42 that is arranged to maintain the desired water level 23. The tank is further served by a drain 43 connected through a drain pipe 44 to a manual valve 46, so that the tank may be emptied for cleaning and to avoid damage when freezing conditions occur.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. A chimney smoke scrubber, including:

a chimney cap enclosure for capturing all smoke and combustion gases emanating from a chimney;

a scrubber enclosure, and means for transferring the smoke and combustion gases from said chimney cap enclosure to said scrubber enclosure;

a stack extending from said scrubber enclosure;

said stack including a plurality of openings to discharge the smoke and combustion gases from said scrubber enclosure;

spray means for forming a curtain of water within said stack adjacent to said plurality of openings, whereby the smoke and combustion gases must pass through said curtain of water to egress through said plurality of openings.

2. The chimney smoke scrubber of claim 1, wherein said spray means includes a spray nozzle disposed within said stack and directed upwardly therein.

3. The chimney smoke scrubber of claim 2, further including a charge of water contained within said scrubber enclosure, and a submersible pump disposed in said water and connected to supply water to said spray nozzle.

4. The chimney smoke scrubber of claim 3, further including means for establishing a predetermined water level in said scrubber enclosure and a predetermined flow space above said water level for the smoke and combustion gases.

5. The chimney smoke scrubber of claim 4, wherein said means for establishing a predetermined water level includes a float valve connected to a source of pressurized water.

6. The chimney smoke scrubber of claim 4, wherein said means for transferring the smoke and combustion gases includes a transfer duct connected between said chimney cap enclosure and said flow space in said scrubber enclosure.

7. The chimney smoke scrubber of claim 2, wherein said stack includes a cap at an upper end thereof, and further including a deflector secured to an inner surface of said cap.

8. The chimney smoke scrubber of claim 7, wherein said spray nozzle is directed toward said detector, said spray nozzle and said deflector cooperatively forming a fountain-like water curtain cascading adjacent to said plurality of openings.

9. The chimney smoke scrubber of claim 8, wherein said plurality of openings are arrayed circumferentially about said upper end of said stack, and said fountain-like water curtain comprises an annular water cascade.

10. A chimney smoke scrubber, including:

a chimney cap enclosure for capturing all smoke and combustion gases emanating from a chimney;

a scrubber enclosure including a charge of water contained therein and a flow space above said charge of water, and means for transferring the smoke and combustion gases from said chimney cap enclosure to said flow space in said scrubber enclosure;

a stack extending from said scrubber enclosure and connecting said flow space to atmosphere;

said stack including a plurality of openings at an upper end thereof to discharge the smoke and combustion gases from said scrubber enclosure;

a stack cap secured to said upper end of said stack, and a deflector secured to an inner surface of said stack cap;

spray means for forming a curtain of water within said stack, said curtain of water cascading in fountain-like fashion adjacent to said plurality of openings, whereby the smoke and combustion gases must pass through said curtain of water to egress through said plurality of openings;

said spray means including a spray nozzle disposed within said stack and directed toward said deflector;

a submersible pump disposed in said water and connected to supply water to said spray nozzle; and, means for establishing a predetermined water level in said scrubber enclosure and a predetermined flow space height above said water level for the smoke and combustion gases.

\* \* \* \* \*